US006985481B2

(12) United States Patent
Brent et al.

(10) Patent No.: US 6,985,481 B2
(45) Date of Patent: *Jan. 10, 2006

(54) SYSTEM AND METHOD FOR HANDLING V.8BIS SIGNALS FOR MODEM CONNECTIONS OVER PACKET NETWORKS

(75) Inventors: Jason B. Brent, Foothill Ranch, CA (US); Patrick D. Ryan, Yorba Linda, CA (US)

(73) Assignee: Mindspeed Technologies, Inc., Newport Beach, CA (US)

(*) Notice: Subject to any disclaimer, the term of this patent is extended or adjusted under 35 U.S.C. 154(b) by 191 days.

This patent is subject to a terminal disclaimer.

(21) Appl. No.: 10/464,291

(22) Filed: Jun. 17, 2003

(65) Prior Publication Data

US 2004/0179514 A1 Sep. 16, 2004

Related U.S. Application Data

(63) Continuation-in-part of application No. 09/965,745, filed on Sep. 28, 2001.

(60) Provisional application No. 60/293,911, filed on May 25, 2001.

(51) Int. Cl.
*H04J 3/16* (2006.01)

(52) U.S. Cl. ..................................................... 370/352

(58) Field of Classification Search ................ 370/401, 370/405, 466, 352, 286, 347, 344, 480, 442, 370/384, 389, 251, 465; 374/93.09, 93.11, 374/100.13
See application file for complete search history.

(56) References Cited

U.S. PATENT DOCUMENTS

| 5,903,547 | A | * | 5/1999 | Shimokasa | 370/232 |
| 5,953,346 | A | * | 9/1999 | Luddy | 370/465 |
| 6,504,838 | B1 | * | 1/2003 | Kwan | 370/352 |
| 6,757,367 | B1 | * | 6/2004 | Nicol | 379/90.01 |
| 6,829,244 | B1 | * | 12/2004 | Wildfeuer et al. | 370/412 |

* cited by examiner

*Primary Examiner*—Dang Ton
(74) *Attorney, Agent, or Firm*—Farjami & Farjami LLP

(57) ABSTRACT

There is provided system and method for communication over a network, which includes a first gateway and a second gateway capable of communicating with each other using a packet protocol. Each gateway is capable of communicating with a local communication device, such as a modem device, over a telephone line. In modem relay mode, each gateway is capable of detecting V.8bis signals from the communication devices, blocking such V.8bis signals, and switching to modem relay mode in response to such detection. In modem pass through mode, each gateway is capable of detecting V.8bis signals from the communication devices and switching to modem pass through mode in response to such detection.

60 Claims, 5 Drawing Sheets

SYSTEM AND METHOD FOR HANDLING V.8BIS SIGNALS FOR MODEM CONNECTIONS OVER PACKET NETWORKS

RELATED APPLICATIONS

The present application is a Continuation-In-Part of U.S. application Ser. No. 09/965,745, filed Sep. 28, 2001, which claims the benefit of U.S. provisional application serial No. 60/293,911, filed May 25, 2001, which are hereby fully incorporated by reference in the present application.

BACKGROUND OF THE INVENTION

1. Field of the Invention

The present invention generally relates to communications over packet networks, such as Internet Protocol ("IP") and, more particularly, to connecting communication devices over IP, such as connecting modem devices over IP.

2. Related Art

Today the traditional analog telephony is being rapidly replaced with digital IP telephony, which use various techniques to break voice into data packets for transmission over packet networks. Analog modems have been utilized to provide data, facsimile and voice communications over twisted pair telephone lines for decades. Modem is an analog-to-digital and digital-to-analog converter, which is capable of adapting a terminal or computer to an analog telephone line by converting digital pulses to audio frequencies and vice versa. Because a significant infrastructure is in place using such modems, the packet networks need to address and support modem communication.

FIG. 1 illustrates a block diagram of a conventional communications network 100 utilizing modems for communication over a packet network protocol, such as Internet Protocol, which may also be referred to as Modem over Internet Protocol ("MoIP"). As shown, communications network 100 includes first communication device 102 in communication with first gateway device 104 and second gateway device 114 in communication with second communication device 122. Communications network 100 further includes a packet network protocol, such as IP 112 to provide communications between first gateway device 104 and second gateway device 114. IP 112 implements the network layer (layer 3) of a network protocol, which contains a network address and is used to route a message to a different network or subnetwork. IP 112 accepts packets from the layer 4 transport protocol, such as Transmission Control Protocol ("TCP") or User Data Protocol ("UDP"), and adds its own header and delivers the data to the layer 2 data link protocol. TCP provides transport functions, which ensures that the total amount of bytes sent is received correctly at the other end. UDP, which is part of the TCP/IP suite, is an alternate transport that does not guarantee delivery. UDP is widely used for real-time voice and video transmissions where erroneous packets are not retransmitted.

Devices 102, 104, 114 and 122 may include modems (modulator-demodulator). Modems may support a variety of data modulation standards, such as ITU (International Telecommunications Union) standards: V.22bis, V.34, V.90 or V.92, etc. Typically, modems have built-in error correction, such as MNP2-4 or LAPM (or V.42) and data compression, such as MNP5, V.42bis or V.44. Modems are also capable of supporting various voice and facsimile standards.

The communication process begins when first communication device 102, e.g. first modem ("M1"), originates a call to establish communications with second communication device 122, e.g. second modem ("M2"). First gateway device 104 ("G1") receives the call and informs second gateway device 114 ("G2") of the call for M2 over communications network 100 and, as a result, G2 calls M2.

Typically, in the default mode of operation, G1 and G2 communicate in voice mode and use compressed voice protocol, such as the ITU standard G.723. Conventionally, after M2 receives the call from G2, M2 answers the call and starts sending certain defined initiating signals, such as an answer tone, which is typically transmitted at about 2100 Hz frequency. At this point, G2 starts confirming the answer tone for a pre-defined period of time, e.g. 50 ms to 1000 ms. Once G2 confirms the answer tone, G2 informs G1 that the present communication session is a modem or facsimile session.

However, once G2 detects the answer tone, e.g., 2100 Hz tone, from M2, then G2 and G1 switch to an uncompressed voice protocol, such as an ITU standard G.711, which provides toll quality audio at 64 Kbps using either A-Law or mu-Law pulse code modulation methods. This uncompressed digital format is used in order to allow easy connections to legacy telephone networks. By switching to G.711, the signals generated by M2 may propagate through from G2 to G1 in a more intact manner in order to reach the first modem at the other side, which is known as modem pass through mode of MoIP. Alternatively, once G2 detects the answer tone from M2, then G1 and G2 may switch into other modes designed to accommodate modem or facsimile devices, such as terminating M1–G1 call and M2–G2 call locally, which is known as modem relay mode of MoIP. The present application hereby incorporates by reference two recent ITU Recommendations, for MoIP, referred to as V.150.0 and V.150.1.

However, there are many drawbacks in the above-described method and system of connecting communication devices, such as modems and facsimile devices over IP. As described above, prior to switching out of compressed voice mode, e.g. G.729 or G.723 to uncompressed voice mode, such as G.711, or to modem or facsimile mode, G2 must confirm presence of answer tone that is being generated by M2 for a sufficient period of time. In other words, all signals that are generated by M2 prior to the generation of the answer tone by M2 are simply passed along by G2 over the packet network to G1 and M1. One set of such signals that may be generated by some modems, such as K56 modems, prior to the answer tone is known as V.8bis signals, which are used to exchange and select modes of operation between modems. V.8bis is an International Telecommunication Union standard, entitled "Procedures for Identification and Selection of Common Modes of Operation Between Data Circuit Terminating Equipments (DCEs) and between Data Terminal Equipments (DTEs) over the Public Switched Telephone Network and on Leased Point-To-Point Telephone Type Circuits", dated November 2000, which is hereby incorporated by reference.

One specific problem occurs in modem relay when M1 and M2 engage in transacting V.8bis signals to exchange modes of operation and select modes of operation prior to configuration of G1 and G2 for modem over IP operation to terminate M1–G1 and M2–G2 connections locally to facilitate a modem relay. For example, in modem relay, end-to-end V.8bis negotiations between M1 and M2 must be blocked, so V.8bis negotiations can occur locally between M1–G1 and M2–G2. If M1 and M2 start negotiating V.8bis capabilities end-to-end, local V.8bis negotiations between M1-G1 and M2 and G2 can no longer be performed and the local connections may fail or fallback to undesirably low speed connections.

Another specific problem occurs in modem pass through when M1 and M2 engage in transacting V.8bis signals to exchange modes of operation and select modes of operation prior to G1 and G2 being configured for modem pass through mode, e.g. switching from G.723.1 to G.711, reconfiguring jitter buffers, disabling echo cancellers, etc. In the event that G1 and G2 are not configured timely for modem pass through mode, modem signals may not be exchanged end-to-end between M1 and M2 in an intact manner due to the interferences caused by G1 and G2 voice configuration, and M1 and M2 connection may either fail or fallback to undesirably low speed connection.

Accordingly, there is an intense need in the art for communication networks utilizing a packet network protocol that are able to efficiently, reliably and timely detect and handle modems that support V.8bis.

SUMMARY OF THE INVENTION

In accordance with the purpose of the present invention as broadly described herein, there is provided system and method for communication over a network. In one aspect of the present invention, the network includes a first gateway device and a second gateway device capable of communicating with each other using a packet protocol. Further, the first gateway device is capable of communicating with a communication device, such as a modem device or a facsimile device, over a standard telecommunication line, such as a PSTN line, a dedicated leased line or the like (hereinafter "telephone line"). The communication device is capable of transmitting V.8bis initiating signals having a first tone segment and a second tone segment. In one aspect of the present invention, a communication method comprises the steps of receiving a call request by the first gateway device from the second gateway device for the communication device, placing a call by the first gateway device to the communication device over the telephone line, enabling a tone detector for detecting the first tone segment, detecting the first tone segment transmitted from the communication device over the telephone line, and preventing, in response to the detecting step, at least one tone in the first tone segment and the second tone segment from reaching the second gateway device.

In one aspect, the first tone segment includes dual tones, and the enabling step enables a single tone detector to detect one of the dual tones. In another aspect, the enabling step enables two tone detectors to detect both of the dual tones.

In a further aspect, the preventing step enables a filter to prevent at least one tone in the first tone segment and the second tone segment from reaching the second gateway device. Further, the first tone segment includes a dual tone, and the filter includes a notch filter centered around one of the dual tones. In another aspect, the filter includes a plurality of notch filters, and wherein each notch filter is centered around a different single tone in the second tone segment.

In an additional aspect, the preventing step includes frequency shifting to prevent at least one tone in the first tone segment and the second tone segment from reaching the second gateway device.

Yet, in another aspect of the present invention, the method further comprises the step of informing the second gateway device of the communication device, in response to the detecting step.

In one aspect, the network includes a first gateway device and a second gateway device capable of communicating with each other using a packet protocol. Further, the first gateway device is capable of communicating with a communication device over a telephone line. The communication device is capable of transmitting V.8bis responding signals having a first tone segment and a second tone segment. In one aspect of the present invention, a communication method comprises the steps of receiving a call request from the second gateway device for the communication device, placing a call to the communication device in response to the call request, enabling a tone detector for detecting the first tone segment from the communication device, receiving the V.8bis initiating signals from the communication device, detecting the first tone segment of the V.8bis initiating signals transmitted from the communication device over the telephone line, and preventing, in response to the detecting step, at least one tone in the first tone segment and the second tone segment from reaching the second gateway device.

In a further aspect, there is provided a first gateway device capable of communicating with a second gateway device over a packet network, the first gateway device capable of communicating with a communication device over a telephone line, the communication device capable of transmitting V.8bis initiating signals having a first tone segment and a second tone segment. The first gateway device comprises a receiver configured to receive a call request from the second gateway device for the communication device, a call module configured to place a call to the communication device over the telephone line, a tone detector configured to detect the first tone segment, and a tone blocking module configured to prevent at least one tone in the first tone segment and the second tone segment from reaching the second gateway device if the tone detector detects the first tone segment transmitted from the communication device over the telephone line.

In another aspect, there is provided a communication method for use by a first gateway device to communicate with a second gateway device over a packet network, the first gateway device capable of communicating with a communication device over a telephone line, the communication device capable of transmitting V.8bis initiating signals having a first tone segment and a second tone segment. The method comprises the steps of: receiving a call request from the second gateway device for the communication device; placing a call to the communication device over the telephone line; enabling a tone detector for detecting the V.8bis initiating signals transmitted from the communication device over the telephone line; detecting, using the tone detector, the V.8bis initiating signals transmitted from the communication device over the telephone line; and configuring the first gateway device for modem communication over the packet network in response to detecting the V.8bis initiating signals. In one aspect, the step of configuring includes configuring the first gateway device for modem pass through operation and, in another aspect, the configuring includes configuring the first gateway device for modem relay operation.

These and other aspects of the present invention will become apparent with further reference to the drawings and specification, which follow. It is intended that all such additional systems, methods, features and advantages be included within this description, be within the scope of the present invention, and be protected by the accompanying claims.

BRIEF DESCRIPTION OF DRAWINGS

The features and advantages of the present invention will become more readily apparent to those ordinarily skilled in the art after reviewing the following detailed description and accompanying drawings, wherein.

DESCRIPTION OF EXEMPLARY EMBODIMENTS

The present invention may be described herein in terms of functional block components and various processing steps. It should be appreciated that such functional blocks may be realized by any number of hardware components and/or software components configured to perform the specified functions. For example, the present invention may employ various integrated circuit components, e.g., memory elements, digital signal processing elements, logic elements, and the like, which may carry out a variety of functions under the control of one or more microprocessors or other control devices. Further, it should be noted that the present invention may employ any number of conventional techniques for data transmission, signaling, signal processing and conditioning, tone generation and detection and the like. Such general techniques that may be known to those skilled in the art are not described in detail herein.

It should be appreciated that the particular implementations shown and described herein are merely exemplary and are not intended to limit the scope of the present invention in any way. For example, although the present invention is described using a modem over IP network, it should be noted that the present invention may be implemented in other communications networks and is not limited to modem over IP.

Figure 2:
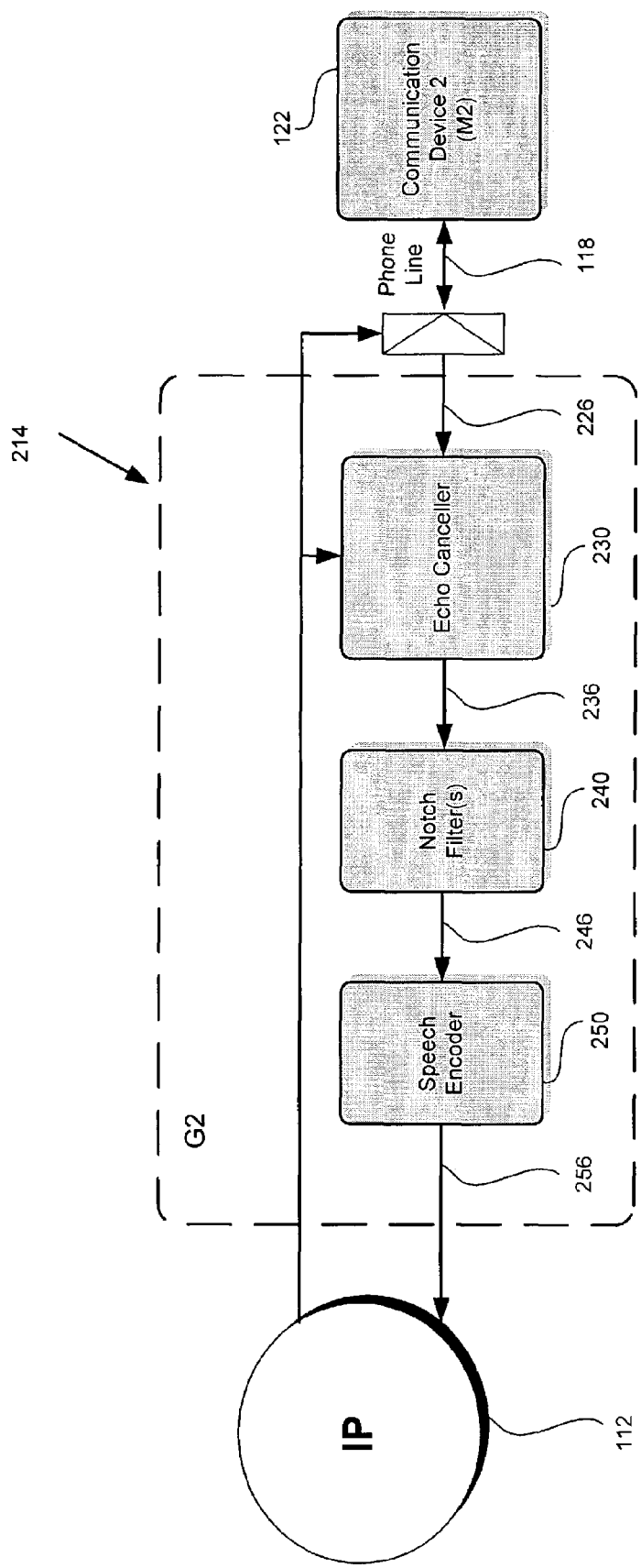
FIG. 2 illustrates a block diagram of a V.8bis handling system in a gateway device according to one embodiment of the present invention.

FIG. 2 illustrates an example V.8bis handling system 214 of the present invention for use by a gateway device to prevent V.8bis signals from being transmitted over the packet network. As described in the V.8bis standard, which has been incorporated in the present application, a V.8bis transaction begins when an answer modem, such as M2, transmits V.8bis initiating signals after going off-hook. The V.8bis initiating signals are divided into two consecutive segments, wherein segment one is a dual tone signal and segment two is a single tone signal. Table 1 below illustrates various V.8bis initiating signals:

TABLE 1

| V.8bis Initiating Signals | | |
| --- | --- | --- |
| V.8bis Initiating Signals | Segment 1 Dual Tones (Hz) | Segment 2 Single Tone (Hz) |
| MRe | 1375 + 2002 | 650 |
| MRd | 1375 + 2002 | 1150 |
| CRe | 1375 + 2002 | 400 |

TABLE 1-continued

| V.8bis Initiating Signals | | |
| --- | --- | --- |
| V.8bis Initiating Signals | Segment 1 Dual Tones (Hz) | Segment 2 Single Tone (Hz) |
| CRd | 1375 + 2002 | 1900 |
| ESi | 1375 + 2002 | 980 |

In response to V.8bis initiating signals, the originating modem transmits V.8bis responding signals, which are also divided into two consecutive segments, wherein segment one is a dual tone signal and segment two is a single tone signal. Table 2 below illustrates various V.8bis responding signals:

TABLE 2

| V.8bis Responding Signals | | |
| --- | --- | --- |
| V.8bis Responding Signals | Segment 1 Dual Tones (Hz) | Segment 2 Single Tone (Hz) |
| Undefined | 1529 + 2225 | 650 |
| MRd | 1529 + 2225 | 1150 |
| Undefined | 1529 + 2225 | 400 |
| CRd | 1529 + 2225 | 1900 |
| ESr | 1529 + 2225 | 1650 |

As described in the V.8bis standard, the dual tones are transmitted for about 400 ms and the following single tone is transmitted for about 100 ms. However, for CRe and MRe, the dual tones may be about 280 ms for compatibility reasons. The tolerance of the frequency of all tones is 250 parts-per-million (ppm) of the nominal value and the tolerance of the duration of tone segments is 2%.

Turning to FIG. 2, V.8bis handling system 214 is shown to comprise a tone blocking module, such as notch filter(s) 240 for filtering one or more tones of V.8bis initiating signals or a frequency shifting element for shifting the frequency spectrum. According to one embodiment of the present invention, filter(s), such as narrow bandpass or notch filter(s) are used at second gateway device 214 to filter out one or more tones of V.8bis initiating signals, such as tones 1375 Hz, 2002 Hz and/or 400 Hz associated with a CRe initiating signals. As shown in FIG. 2, echo canceller 230 receives signal 226 as input from telephone line 118. Echo canceller 230 is used for canceling any echoes that may arise from telephone line 118. Echo canceller 230 improves detection performance by mitigating echo and is well known in the art. Echo canceller output 236 is filtered by notch filter(s) 240. Notch filter(s) output 246 is coupled to input of speech encoder 250. Speech encoder output 256 is then sent across IP 112.

In one embodiment, notch filter(s) 240 is a single notch filter centered around one of the dual tones 1375 Hz or 2002 Hz. In another embodiment, notch filter(s) 240 include two notch filters centered around each of the dual tones 1375 Hz and 2002 Hz. In yet another embodiment, notch filter(s) 240 can include more notch filters centered around each of the single tones following the dual tones, such as notch filters for 650 Hz, 1150 Hz, 400 Hz, 1900 Hz and. 980 Hz. By providing notch filter(s) 240, one or more tones of the V.8bis initiating signals is prevented from being transmitted over IP 112 and, thus, V.8bis negotiations between M1 and M2 are prevented.

In another embodiment (not shown), notch filter(s) 240 may precede echo canceller 230 in FIG. 2, such that notch filter(s) 240 receive telephone line signal 226 before it reaches echo canceller 230 and output of notch filter(s) 240 are then fed into echo canceller 230 coupled to speech encoder 250. Furthermore, in yet another embodiment similar to that of FIG. 2, V.8bis handling system 214 does not include echo canceller 230 and, therefore, notch filter(s) 240 receive telephone line signal 226 and an output of notch filter 240 is then fed into speech encoder 250.

In other embodiments of the present invention, however, it may be desirable not to leave notch filter(s) 240 enabled continuously, since notch filter(s) 240 may potentially interfere with linear predictive coding used by speech encoder 250, for example, if speech encoder 250 is configured for G.729 speech coding. Accordingly, in one embodiment, notch filter(s) 240 may be enabled for a pre-determined amount of time, e.g. one to two seconds, after G2 214 places a call to M2 122. As stated above, V.8bis initiating signals, in general, last about 0.5 second and are generated by M2 122 upon answering the call. If V.8bis initiating signals are substantially blocked by notch filter(s) 240, then M1 102 will continue to wait until G1 and G2 switch over to modem over IP configuration, in order to properly handle a modem or facsimile communication.

It should be noted that in an alternative embodiment, rather than employing notch filter(s) 240, in place thereof, a frequency shifting block may be employed for a predetermine period of time, such as 0.5 sec, at the beginning of each call to shift all signals received from communication device 122 up or down by more than allotted frequency tolerance prior to transmission of the same over IP 112 in order to prevent M1 from detecting V.8bis initiating signals.

Figure 3:
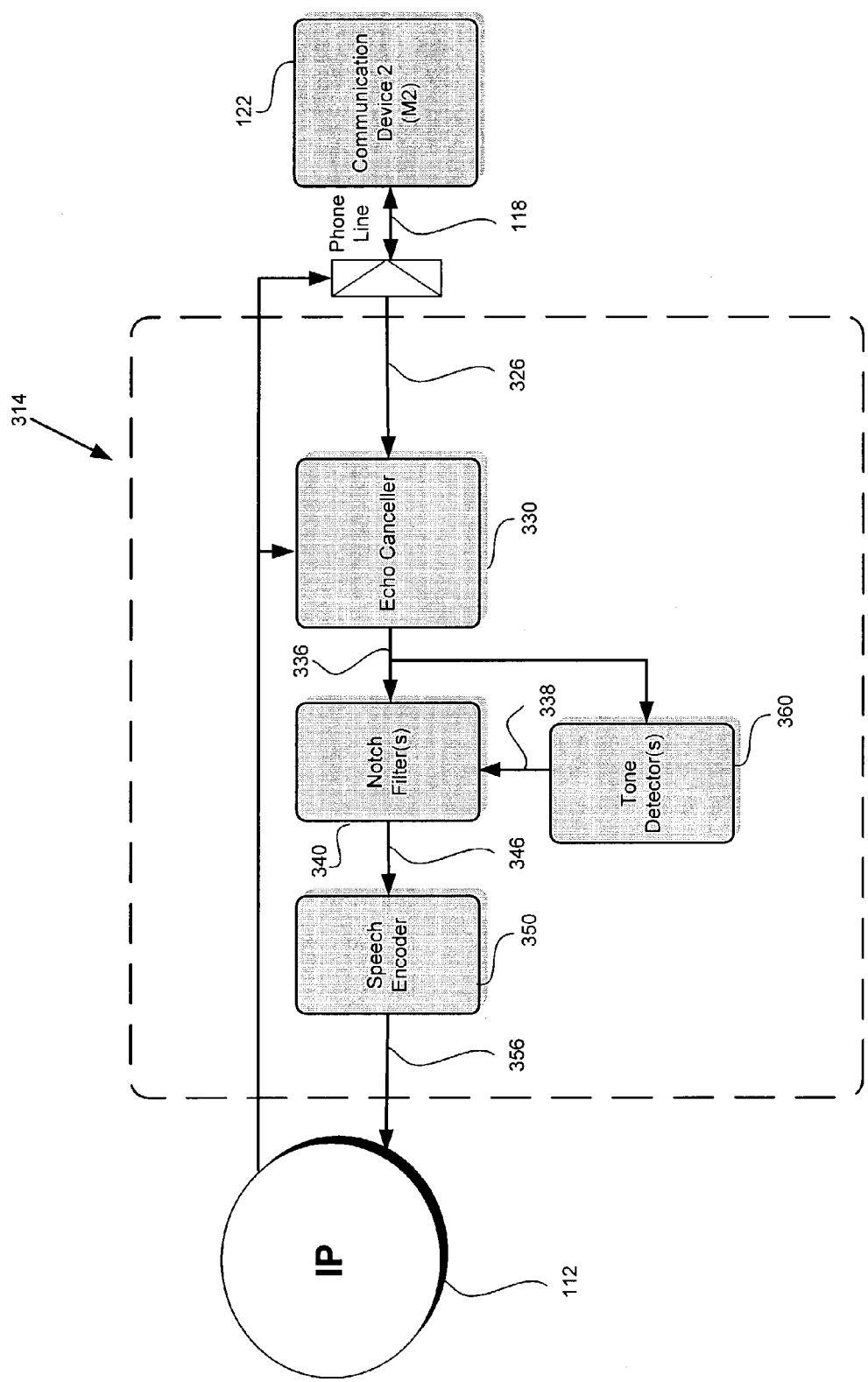
FIG. 3 illustrates a block diagram of a V.8bis handling system in a gateway device according to one embodiment of the present invention.

Yet, in some embodiments, a tone detector may be utilized to timely enable or disable notch filter(s) 240. As shown in FIG. 3, block 314 corresponds to elements that may be found in second gateway device 114 of FIG. 1. Although only a portion of the elements of second gateway device 314 is shown, for brevity, block 314 will be referred to as gateway device 314 herein. As shown, echo canceller 330 receives telephone line signal 326 as input from telephone line 118. Echo canceller output 336 can be filtered by notch filter(s) 340 that, in one embodiment, are centered around one or both dual tones of the first segment of V.8bis initiating signals and/or each of single tones of the second segment. Notch filter(s) 340 are enabled by tone detector(s) 360. Notch filter output 346 is further coupled to an input of speech encoder 350. Speech encoder output 356 is then sent across IP 112.

As shown in FIG. 3, echo canceller output 336 is also provided as input to tone detector(s) 360. In another embodiment, tone detector 360 may receive input signal 336 from telephone line signal 326 instead of receiving echo canceller output 336. If tone detector(s) 360 detect that input signal 326 or 336 indicate one or both dual tones of the first segment of the V.8bis initiating signals, then tone detector(s) 360 enable notch filter(s) 340 by way of notch filter control signal(s) 338, otherwise notch filter(s) 340 are disabled by way of notch filter control signal(s) 338.

Tone detector(s) 360 allow notching only when they detect presence of one or both of 1375 Hz and 2002 Hz tones for a pre-determined amount of time. Using tone detector(s) 360 reduces the chance of notch filter(s) 340 interfering with LPC analysis of speech encoders such as G.729. Tone detector(s) 360 should detect one or both of 1375 Hz and 2002 Hz tones sufficiently fast so that notch filter(s) 340 are enabled timely to prevent M1 from receiving enough portion of the following single tone in the second segment that can be confirmed as a valid duration for V.8bis initiating signals by M1. In one embodiment, tone detector(s) 360 enable notch filter(s) 340 if tone detector(s) 360 detects about 10–20 milliseconds of one or both of 1375 Hz and 2002 Hz tones. It should be noted that in one embodiment, the tone detector(s) may be configured to detect 200–250 milliseconds of one or both of 1375 Hz and 2002 Hz tones prior to enabling notch filter(s) 340, since the shortest duration for the first segment of the V.8bis initiating signals is about 280 ms. By utilizing a longer duration for tone detection, false tone detection may be avoided, although a larger portion of the V.8bis signals are allowed to pass through the gateway device. Where a longer duration for tone detection is utilized, e.g. 200–250 ms, notch filter(s) 340 may be enabled for blocking only the following single tone; however, if a shorter duration for tone detection is utilized, e.g. 20–50 ms, notch filter(s) 340 may be enabled for blocking one or both dual tones and/or the following single tone.

In one embodiment, tone detector(s) 360 may enable notch filter 340 only during a pre-determined amount of time, e.g. half a second to one second, after G2 214 places a call to M2 122. Further as described in conjunction with FIG. 2, second gateway device 214 may or may not include an echo canceller. In such event, tone detector(s) 360 and notch filter(s) 340 would receive telephone line signal 326.

As noted above, in an alternative embodiment of FIG. 3, rather than employing notch filter(s) 340, in place thereof, a frequency shifting block may be employed to shift all signals received from communication device 122 up or down by more than allotted frequency tolerance prior to transmission of the same over IP 112 in order to prevent M1 from detecting V.8bis initiating signals.

Also, in one embodiment, G2 may use the detection of V.8bis initiating signals, rather than detection of answer tone, as the trigger event to configure itself for modem over IP operation and also inform G1 of the same. For example, G2 may detect one or more tones in the first tone segment and/or second tone segment of V.8bis initiating signals and inform G1 that V.8bis initiating signals have been detected by transmitting a message to G1. It should also be pointed out that notch filter(s) of FIG. 2 or notch filter(s) 340 and tone detector(s) 360 of FIG. 3 can also be employed by a gateway device, such as G1, at the IP receiver side to prevent V.8bis initiating signals generated by M2, and not blocked by G2, from being received by M1. Further, gateway devices may use similar schemes to prevent V.8bis responding signals from reaching the client modems (M1 and M2). To this end, it should be understood by one of ordinary skill in the art that tone detector(s) and notch filter(s) must be configured according to the tones in the first segment of the V.8bis responding signals, i.e. dual tones of 1529 Hz and 2225 Hz, and the second segment tones of the V.8bis responding signals, i.e. single tones 650 Hz, 1150 Hz, 400 Hz, 1900 Hz and 1650 Hz.

Figure 4:
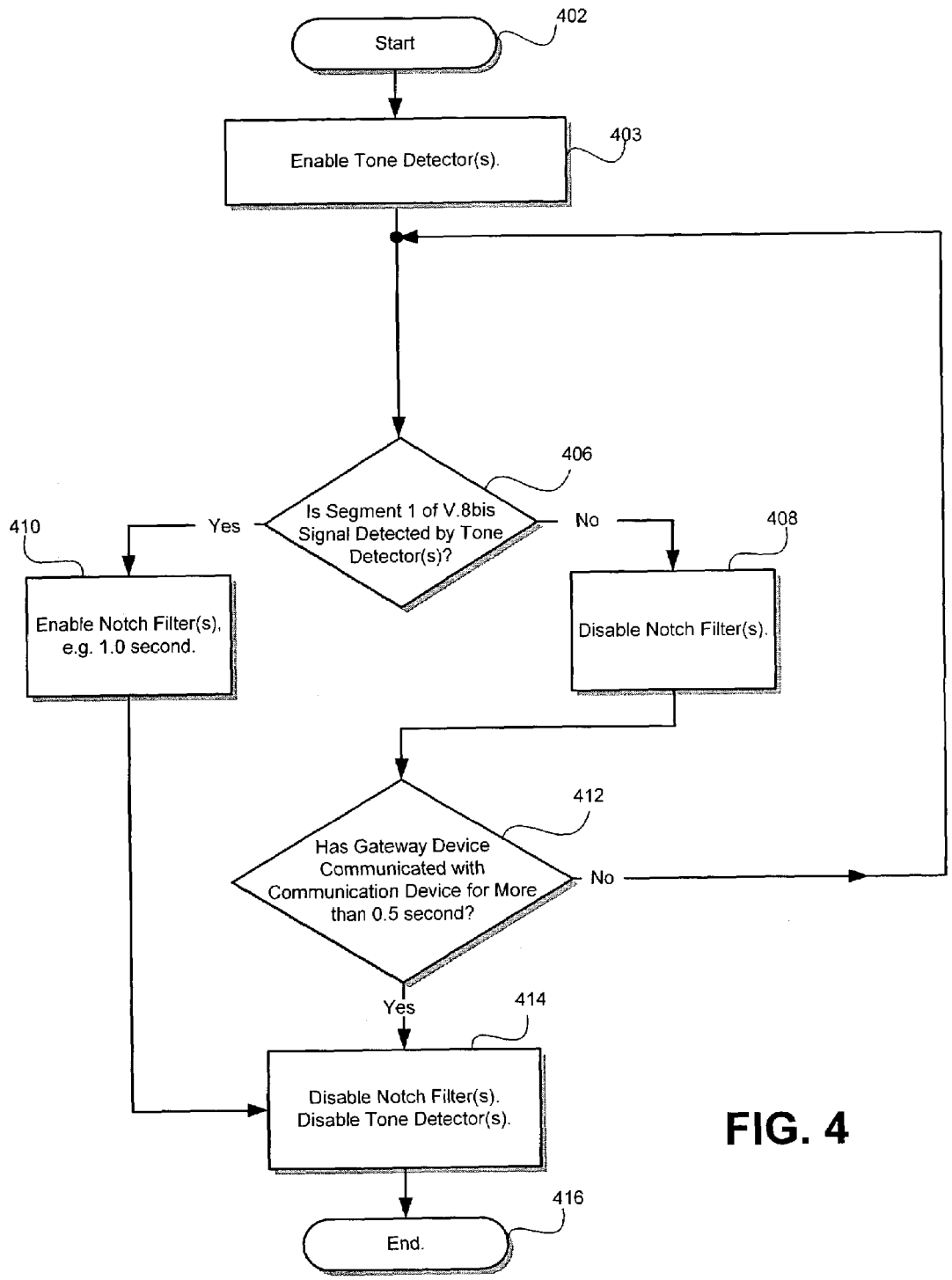
FIG. 4 illustrates a flow diagram of an exemplary method of using the gateway device of FIG. 3.

FIG. 4 illustrates an exemplary method in accordance with one embodiment of the present invention, which is described in conjunction with V.8bis handling system 314 of FIG. 3. As shown, flow diagram of FIG. 4 begins at step 402 by enabling tone detector(s) 360 for detection of one or both dual tones of V.8bis initiating signals (or V.8bis responding signals if the method if performed by G1). In step 406, tone detector(s) 360 debounce echo canceller output 336 for a predetermined period of time that could range from 10–20 ms, for fast tone detection, to 200–250 ms to determine presence of one or both of dual tones of V.8bis initiating signals (or V.8bis responding signals) being received on telephone line signal 326. In step 406, if tone detector(s) 360 detect one or both dual tones, then the method of FIG. 4 proceeds to step 410, otherwise, it proceeds to step 408. In step 408, since one or both dual tones are not detected, notch filter(s) 340 are disabled or remain disabled and the method then proceeds to step 412.

On the other hand, in step 410, since one or both dual tones are detected, notch filter(s) 340 are enabled, for a predetermined period of time, such as one (1) second, to prevent the remaining portions of dual tones and/or single tone of the second segment from being transmitted by the gateway device, and the method proceeds to step 414.

In step 412, according to one embodiment of the present invention, a determination is made as to whether the gateway device has been in communication with its local client modem for longer than a pre-determined amount of time, e.g. 0.5–1.0 second. If the determination is true, the method proceeds to step 414. Otherwise, the method proceeds to step 404 to continue detecting presence of one or more dual tones.

In step 414, since it has been determined that the gateway device has been in communication with its local client modem for more than the predetermined period of time, notch filter(s) 340 and tone detector(s) 360 are disabled, and the method proceeds to step 416, where it ends.

Figure 1:
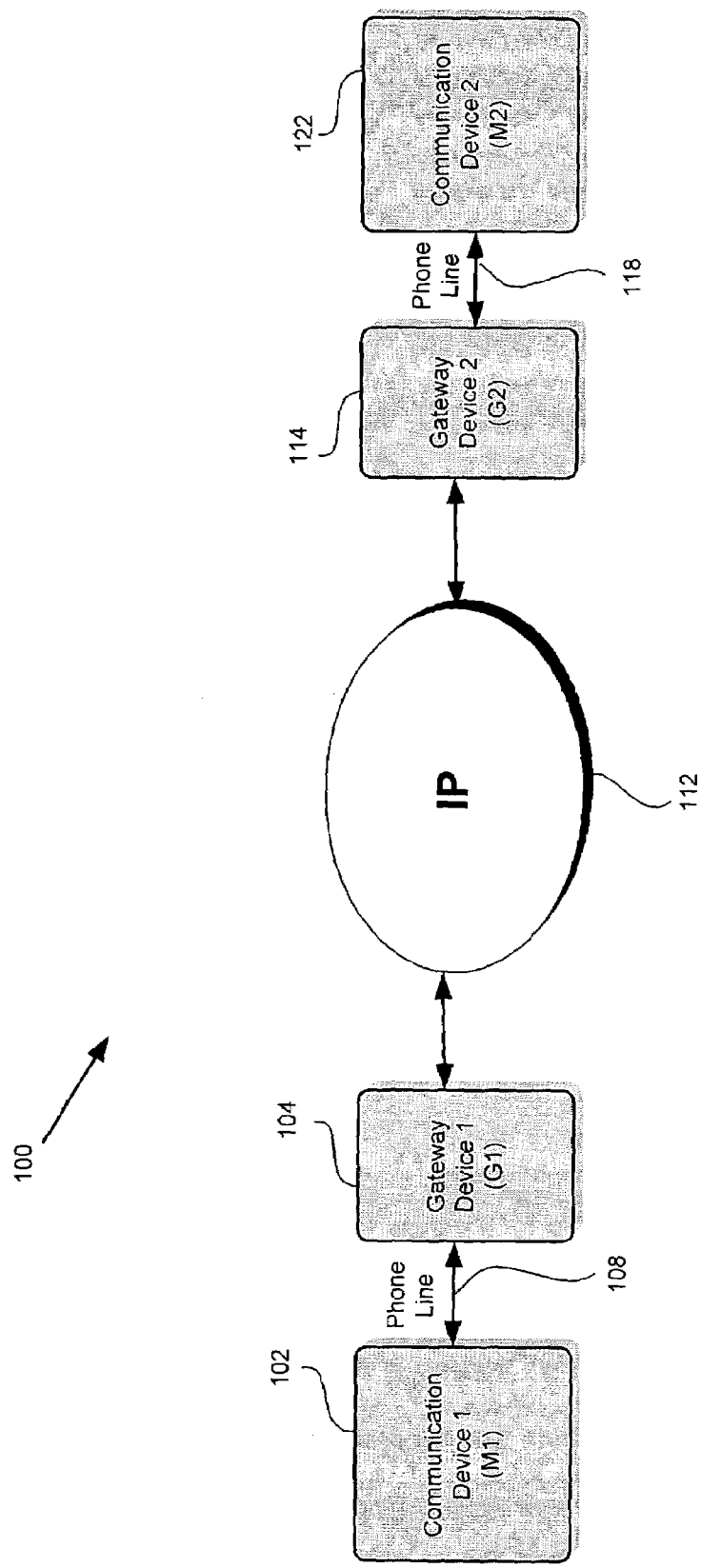
FIG. 1 illustrates a block diagram of a conventional communications network utilizing modems for communication over a packet network protocol.
Figure 5:
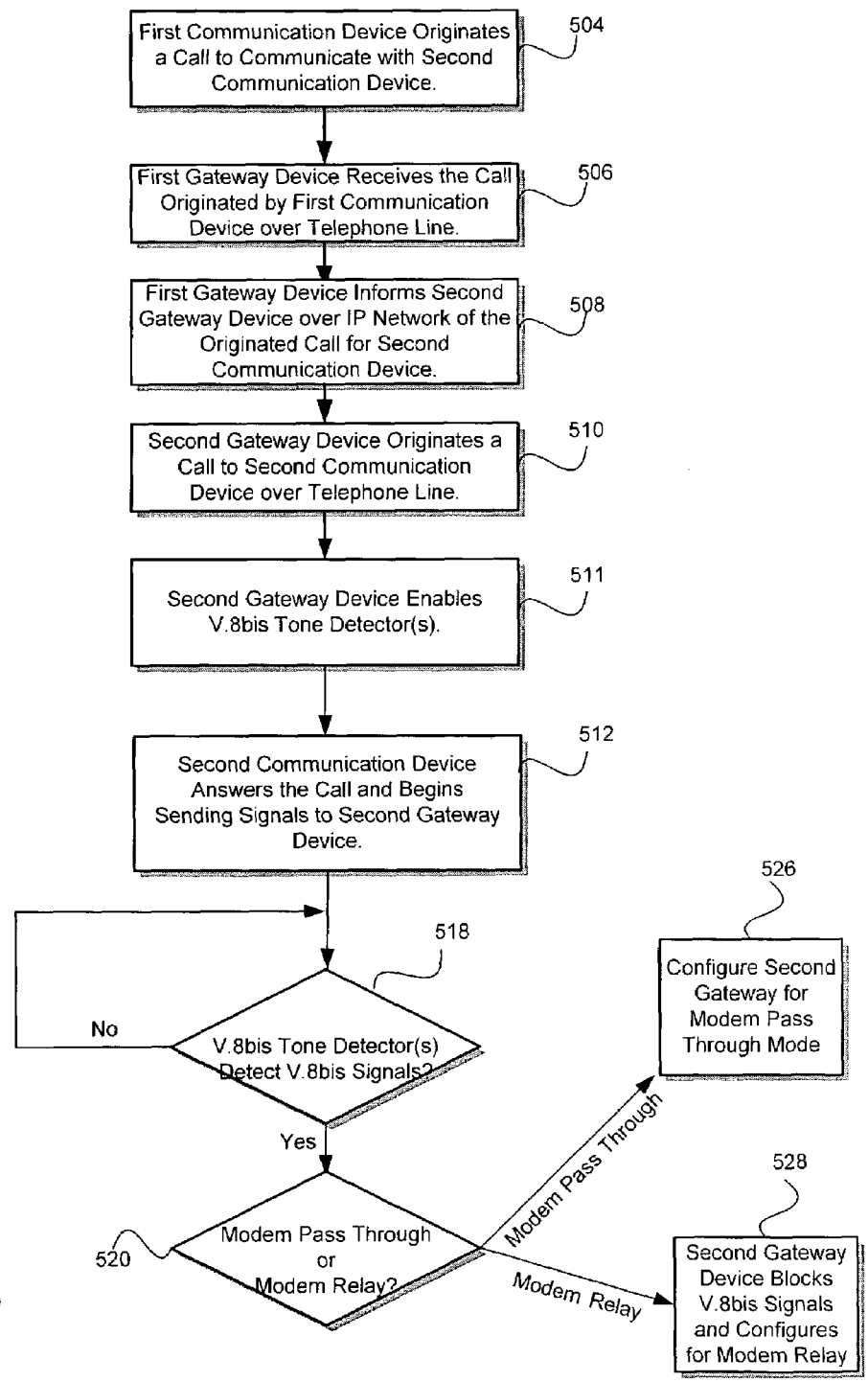
FIG. 5 illustrates a flow diagram of an exemplary method of communication over IP network of FIG. 1.

FIG. 5 illustrates an exemplary method in accordance with one embodiment of the present invention for use by V.8bis handling system 314 of FIG. 3 in communications network of FIG. 1. Flow diagram begins at step 504 when first communication device 102 originates a call to communicate with second communication device 122. In step 506, first gateway device 104 receives the call from first communication device 102 over telephone line 108. In step 508, first gateway device 104 informs second gateway device 314 of the originated call for second communication device 122, over IP network 112. In step 510, second gateway device 314 originates a call to second communication device 122 over telephone line 118. In step 511, second gateway device 314 enables one or two tone detector(s) 360 to detect one or both dual tones in the first segment of V.8bis initiating signals. In step 512, second communication device 122 answers the call originated by second communication device 122 and starts transmitting V.8bis initiating signals.

In step 518, second gateway device 314 determines whether segment 1 of V.8bis initiating signals are being detected by confirming one or both dual tones of the first segment and/or single tone of the second segment. If, at step 518, V.8bis initiating signals are confirmed or validated by second gateway device 314 or G2, flow diagram moves to step 520. At step 520, it is determined whether G2 is set up for modem relay or modem pass through to support MoIP. If G2 is configured for modem pass through, the process moves to step 526, where G2 configures itself with modem pass through settings, such as switching from one voice mode, such as G.723.1, to another voice mode, such as G.711, to provide toll quality voice, so that V.8bis signals can reach G1 over IP 112 in a more intact manner. Other modem pass through settings may include changing the jitter buffer size, disabling echo canceller, etc. Further, G2 also informs G1 over the IP 112 that M2 is a modem and, as a result, G1 also configures modem pass through mode On the other hand, if G2 is configured for modem relay, the process moves to step 528, where G2 configures itself to act as a modem to negotiate a connection with M2 and terminate the call locally between G2 and M2 and prevents one or both tones in the first segment of V.8bis initiating signals and/or the second segment tone from reaching G1.

As an example of MoIP connection based on flow diagram of FIG. 5, to support modem relay for K56 modems, in one embodiment, at step 511, G2 enables its tone detector to detect one or both 1375 Hz and 2002 Hz tones, in the dual tone segment of the CRe signal, for a predetermined amount of time, such as 50 ms, to confirm detection of the CRe signal. Next, at steps 518, 520 and 528, in one embodiment, G2 confirms the first tone segment of CRe and enables its notch filter to prevent the single tone segment of the CRe signal, i.e. 1900 Hz, from reaching G1 over IP 112. In one embodiment, upon detection of the first segment of the CRe signal, G2 also informs G1 of the detection of the K56 modem or G1 infers from a message from G2 or G2's action that G1 should also switch to modem relay mode.

Furthermore, G1 and G2 may also detect the responding signal in the K56 modem, i.e. CRd. For example, G1 may enable its tone detector to detect one or both 1529 Hz and 2225 Hz tones, in the dual tone segment of the CRd signal, for a predetermined amount of time, such as 50 ms, to confirm detection of the CRd signal. Next, G2 may then enable its notch filter to prevent the single tone segment of the CRd signal, i.e. 1900 Hz, from reaching G2 over IP 112.

As discussed above, flow diagrams of FIGS. 4 and 5 can be used or modified to be used to detect and block V.8bis responding signals in similar fashions as detecting and blocking V.8bis initiating signals, as described above. Further, similar methods can be used to detect and block V.8bis signals being received by a gateway device over IP 112. In addition, as mentioned above, in some embodiments, a single tone detector and a single notch filter may be used to detect and prevent V.8bis signals from being transmitted. For example, a single tone detector may be used to detect one tone in the first segment of V.8bis initiating signals, e.g. 1375 Hz, and a single notch filter may be used to prevent the same tone from being passed through. As a further example, in another embodiment, two tone detectors may be used to confirm dual tones in the first segment and five notch filters may be used to block each of five possible single tones in the second segment of V.8bis initiating signals. Accordingly, one of ordinary skill in the art should understand that there are various arrangements of tone detector(s) and notch filter(s) to prevent transmission of one or more V.8bis signals. Furthermore, as described above, in flow diagrams of FIGS. 4 and 5, in place of notch filter(s), in one embodiment, the frequency spectrum or the power level for V.8bis signals may be shifted up or down by more than allotted frequency tolerance or power level tolerance prior to transmission of V.8bis signals by the gateway device in order to prevent detection of V.8bis signals by a remote device.

The methods and systems presented above may reside in software, hardware, or firmware on the device, which can be implemented on a microprocessor, digital signal processor, application specific IC, or field programmable gate array ("FPGA"), or any combination thereof, without departing from the spirit of the invention. Furthermore, the present invention may be embodied in other specific forms without departing from its spirit or essential characteristics. The described embodiments are to be considered in all respects only as illustrative and not restrictive.

What is claimed is:

1. A communication method for use by a first gateway device to communicate with a second gateway device over a packet network, said first gateway device capable of communicating with a communication device over a telephone line, said communication device capable of transmitting V.8bis initiating signals having a first tone segment and a second tone segment, said method comprising the steps of:

receiving a call request from said second gateway device for said communication device;

placing a call to said communication device over said telephone line;

enabling a tone detector for detecting said first tone segment;

detecting said first tone segment transmitted from said communication device over said telephone line; and preventing, in response to said detecting step, at least one tone in said first tone segment and said second tone segment from reaching said second gateway device.

2. The method of claim 1, wherein said communication device is a modem device.

3. The method of claim 1, wherein said preventing step enables a filter to prevent at least one tone in said first tone segment and said second tone segment from reaching said second gateway device.

4. The method of claim 1, wherein said first tone segment includes dual tones, and wherein said enabling step enables a single tone detector to detect one of said dual tones.

5. The method of claim 1, wherein said first tone segment includes dual tones, and wherein said enabling step enables two tone detectors to detect both of said dual tones.

6. The method of claim 1, wherein said step of enabling said tone detector enables said tone detector for a predetermined period of time.

7. The method of claim 3, wherein said first tone segment includes a dual tone, and wherein said filter includes a notch filter centered around one of said dual tones.

8. The method of claim 3, wherein said filter includes a plurality of notch filters, and wherein each notch filter is centered around a different single tone in said second tone segment.

9. The method of claim 1, wherein said step of enabling said tone detector enables said tone detector to detect at least one tone in said first tone segment of a CRe initiating signal.

10. The method of claim 1 further comprising a step of informing said second gateway device of said communication device, in response to said detecting step.

11. The method of claim 1 further comprising a step of configuring said first modem for MoIP operation.

12. The method of claim 11, wherein said step of configuring modem for said MoIP operation configures said first gateway device for modem pass through operation.

13. The method of claim 11, wherein said step of configuring modem for said MoIP operation configures said first gateway device for modem relay operation.

14. A communication method for use by a first gateway device to communicate with a second gateway device over a packet network, said first gateway device capable of communicating with a communication device over a telephone line, said communication device capable of transmitting V.8bis responding signals having a first tone segment and a second tone segment, said method comprising the steps of:

receiving a call request from said second gateway device for said communication device;

placing a call to said communication device in response to said call request;

enabling a tone detector for detecting said first tone segment from said communication device;

receiving said V.8bis initiating signals from said communication device;

detecting said first tone segment of said V.8bis initiating signals transmitted from said communication device over said telephone line; and preventing, in response to said detecting step, at least one tone in said first tone segment and said second tone segment from reaching said second gateway device.

15. The method of claim 14, wherein said communication device is a modem device.

16. The method of claim 14, wherein said preventing step enables a filter to prevent at least one tone in said first tone segment and said second tone segment from reaching said second gateway device.

17. The method of claim 14, wherein said first tone segment includes dual tones, and wherein said enabling step enables a single tone detector to detect one of said dual tones.

18. The method of claim 14, wherein said first tone segment includes dual tones, and wherein said enabling step enables two tone detectors to detect both of said dual tones.

19. The method of claim 14, wherein said step of enabling said tone detector enables said tone detector for a predetermined period of time.

20. The method of claim 16, wherein said first tone segment includes a dual tone, and wherein said filter includes a notch filter centered around one of said dual tones.

21. The method of claim 16, wherein said filter includes a plurality of notch filters, and wherein each notch filter is centered around a different single tone in said second tone segment.

22. The method of claim 14, wherein said step of enabling said tone detector enables said tone detector to detect at least one tone in said first tone segment of a CRd responding signal.

23. The method of claim 14 further comprising a step of informing said second gateway device of said communication device, in response to said detecting step.

24. The method of claim 14 further comprising a step of configuring said first modem for MoIP operation.

25. The method of claim 24, wherein said step of configuring modem for said MoIP operation configures said first gateway device for modem pass through operation.

26. The method of claim 24, wherein said step of configuring modem for said MoIP operation configures said first gateway device for modem relay operation.

27. A first gateway device capable of communicating with a second gateway device over a packet network, said first gateway device capable of communicating with a communication device over a telephone line, said communication device capable of transmitting V.8bis initiating signals having a first tone segment and a second tone segment, said first gateway device comprising:

a receiver configured to receive a call request from said second gateway device for said communication device;

a call module configured to place a call to said communication device over said telephone line;

a tone detector configured to detect said first tone segment; and a tone blocking module configured to prevent at least one tone in said first tone segment and said second tone segment from reaching said second gateway device if said tone detector detects said first tone segment transmitted from said communication device over said telephone line.

28. The first gateway device of claim 27, wherein said communication device is a modem device.

29. The first gateway device of claim 27, wherein said tone blocking module includes a filter to prevent at least one tone in said first tone segment and said second tone segment from reaching said first gateway device.

30. The first gateway device of claim 27, wherein said tone blocking module includes a frequency shifting element to prevent at least one tone in said first tone segment and said second tone segment from reaching said first gateway device.

31. The first gateway device of claim 27, wherein said first tone segment includes dual tones, and wherein said tone detector includes a single tone detector to detect one of said dual tones.

32. The first gateway device of claim 27, wherein said first tone segment includes dual tones, and wherein said tone detector includes two tone detectors to detect both of said dual tones.

33. The first gateway device of claim 27, wherein said tone detector is enabled for a pre-determined period of time.

34. The first gateway device of claim 29, wherein said first tone segment includes a dual tone, and wherein said filter includes a notch filter centered around one of said dual tones.

35. The first gateway device of claim 29, wherein said filter includes a plurality of notch filters, and wherein each notch filter is centered around a different single tone in said second tone segment.

36. The first gateway device of claim 27, wherein said first gateway device informs said second gateway device of said communication device, in response to detecting said first tone segment by said tone detector.

37. The first gateway device of claim 27, wherein said tone detector is enabled to detect at least one tone in said first tone segment of a CRe initiating signal.

38. The first gateway device of claim 27, wherein said first gateway device configures itself for MoIP operation in response to said tone detector detecting said first tone segment.

39. The first gateway device of claim 38, wherein said first gateway device configures itself for modem pass through operation.

40. The first gateway device of claim 38, wherein said first gateway device configures itself for modem relay operation.

41. A communication method for use by a first gateway device to communicate with a second gateway device over a packet network, said first gateway device capable of communicating with a communication device over a telephone line, said communication device capable of transmitting V.8bis initiating signals having a first tone segment and a second tone segment, said method comprising the steps of:
   receiving a call request from said second gateway device for said communication device;
   placing a call to said communication device over said telephone line;
   enabling a tone detector for detecting said V.8bis initiating signals transmitted from said communication device over said telephone line;
   detecting, using said tone detector, said V.8bis initiating signals transmitted from said communication device over said telephone line; and
   configuring said first gateway device for modem communication over said packet network in response to said step of detecting.

42. The method of claim 41, wherein said communication device is a modem device.

43. The method of claim 41, wherein said detecting step detects said first tone segment of said V.8bis initiating signals.

44. The method of claim 43, wherein said first tone segment includes dual tones, and wherein said detecting step detects one of said dual tones.

45. The method of claim 43, wherein said first tone segment includes dual tones, and wherein said detecting step detects both of said dual tones.

46. The method of claim 41, wherein said detecting step detects both said first tone segment and said second tone segment.

47. The method of claim 41 further comprising a step of informing said second gateway device of said communication device, in response to said detecting step, wherein said informing step includes transmitting a message that V.8bis initiating signals have been detected.

48. The method of claim 41, wherein said detecting step detects at least one tone in said first tone segment of a CRe signal.

49. The method of claim 41, wherein said step of configuring includes configuring said first gateway device for modem pass through operation.

50. The method of claim 41, wherein said step of configuring includes configuring said first gateway device for modem relay operation.

51. A first gateway device capable of communicating with a second gateway device over a packet network, said first gateway device capable of communicating with a communication device over a telephone line, said communication device capable of transmitting V.8bis initiating signals having a first tone segment and a second tone segment, said first gateway device comprising:
   a receiver configured to receive a call request from said second gateway device for said communication device;
   a call module configured to place a call to said communication device over said telephone line; and
   a tone detector configured to detect said V.8bis initiating signals transmitted from said communication device over said telephone line;
   wherein said tone detector detects said V.8bis initiating signals transmitted from said communication device over said telephone line, and said first gateway device configures itself for modem communication over said packet network in response to said tone detector detecting said V.8bis initiating signals.

52. The first gateway device of claim 51, wherein said communication device is a modem device.

53. The first gateway device of claim 51, wherein said tone detector detects said first tone segment of said V.8bis initiating signals.

54. The first gateway device of claim 53, wherein said first tone segment includes dual tones, and wherein said tone detector detects one of said dual tones.

55. The first gateway device of claim 53, wherein said first tone segment includes dual tones, and wherein said tone detector detects both of said dual tones.

56. The first gateway device of claim 51, wherein said tone detector detects both said first tone segment and said second tone segment.

57. The first gateway device of claim 51, wherein said first gateway device informs said second gateway device of said communication device, in response to said tone detector detecting said V.8bis initiating signals, by transmitting a message that V.8bis initiating signals have been detected.

58. The first gateway device of claim 51, wherein said tone detector detects at least one tone in said first tone segment of a CRe signal.

59. The first gateway device of claim 51, wherein said first gateway device configures itself for modem pass through operation.

60. The first gateway device of claim 51, wherein said first gateway device configures itself for modem relay operation.

* * * * *